United States Patent [19]

Sokolov et al.

[11] 4,169,932

[45] Oct. 2, 1979

[54] METHOD OF PRODUCING POLY-P-PHENYLENETEREPHTHALA-MIDE OR ITS COPOLYMERS

[76] Inventors: Lev B. Sokolov, ulitsa Truda, 18, kv. 35; Valentin M. Savinov, ulitsa Ustina Labe, 20, kv. 20; Vyacheslav S. Petrukhin, ulitsa Mira, 40, kv. 13, all of Vladimir, U.S.S.R.

[21] Appl. No.: 933,103

[22] Filed: Aug. 11, 1978

Related U.S. Application Data

[63] Continuation of Ser. No. 708,347, Jul. 26, 1976, abandoned.

[51] Int. Cl.$^2$ .................. C08G 69/28; C08G 69/32
[52] U.S. Cl. .................................. 528/179; 528/183; 528/207; 528/208; 528/220; 528/222; 528/229; 528/336; 528/337; 528/348
[58] Field of Search ............... 528/336, 348, 179, 222, 528/207

[56] References Cited

U.S. PATENT DOCUMENTS

| | | | |
|---|---|---|---|
| 3,063,996 | 11/1962 | Kwolek et al. ............... | 528/348 |
| 3,068,188 | 12/1962 | Beste et al. ................... | 528/336 |
| 3,696,076 | 10/1972 | Vogelfanger ................. | 528/336 |
| 3,966,686 | 6/1976 | Asakura et al. .............. | 528/336 |

OTHER PUBLICATIONS

Japanese Patent Application Publication, 74/122594, Nov. 1974, Chimura et al.-English Translation.
Federov et al., (1), Polymer Science, (USSR), 12, #10-12, (1970), pp. 2475-2491, English Translation.
Federov et al., (2), Vysokomolekulyarnye Soedineniya, (B), 11, (1969), pp. 129-132, English Translation.
Fiber Forming Aromatic Polyamides, Man-Made Fibers, vol. 2, (1968), p. 301.
Polymery, (1971), pp. 514-515, Chodkowski et al., English Translation.

*Primary Examiner*—Harold D. Anderson
*Attorney, Agent, or Firm*—Haseltine, Lake & Waters

[57] ABSTRACT

A method of producing poly-p-phenyleneterephthalamide or its copolymers residing in that p-phenylenediamine or p-phenylenediamine and an aromatic diamine of the diphenyl series is/are disclosed in amide-salt solvents consisting of linear or cyclic N-alkyl-substituted amides of acids and of salts of alkaline or alkaline-earth metals soluble in said amides in amounts of 1-3 moles per mole of diamines; terephthalic acid dichloride or a mixture of terephthalic acid dichloride and aromatic acid dichloride of the diphenyl series are introduced into the solutions obtained at 0°-20° C. in amounts equimolar to those of the diamines, a reaction mixture being thus formed; tertiary amines are introduced into said reaction mixture in amounts 2-6 moles per mole of the initial diamines; the reaction mixture is stirred for 3-70 minutes and the end product is separated from the mass obtained.

The method proposed herein is technologically simple and provides high-molecular polymeric products suitable for manufacturing heat-resistant, high-strength, and high-modulus fibres.

4 Claims, No Drawings

METHOD OF PRODUCING POLY-P-PHENYLENETEREPHTHALAMIDE OR ITS COPOLYMERS

This is a continuation of U.S. Ser. No. 708,347, filed July 26, 1976, now abandoned.

The present invention relates to methods of producing poly-p-phenyleneterephthalamide or its copolymers, namely, aromatic polyamides, suitable for manufacturing heat-resistant, high-strength, and high-modulus fibres.

Said polyamides possess high heat resistance, high melting points, and stability towards the majority of organic solvents.

The fibres made of poly-p-phenyleneterephthalamide and its copolymers have a strength of 140–225 gs/tex upon elongation by 5–2%, elongation modulus 6,000–14,000 kgs/mm$^2$, and a density of 1.43–1.46 g/cm$^3$. Said fibres are poorly combustible, chemically stable, and have a good fatigue and long-term strength. They can be used as a tire core as well as in manufacturing reinforced multipurpose plastics.

Known in the art are methods of producing poly-p-phenyleneterephthalamide and its copolymers, most preferable, in terms of obtaining a high-molecular polymer, being the methods based on the reaction of polycondensation of p-phenylenediamine with terephthalic acid dichloride proceeding in a solution at a temperature below 100° C. When copolymers are produced, part (5–50 mol.%) of p-phenylenediamine and/or terephthalic and dichloride is replaced by other aromatic monomer (diamine or acid dichloride respectively).

Common to all the known methods is the use of p-phenylenediamine as one of the monomers which in the form of a solution in a particular organic solvent reacts with solid or molten terephthalic acid dichloride.

A serious disadvantage of p-phenylenediamine as an initial monomer for producing poly-p-phenyleneterephthalate is its ability to be rather readily oxidized both in the process of its production and storage and in the process of obaining a polymer from it. Oxidation is especially fast when p-phenylendiamine is in a dissolved state. In this connection, the production of poly-p-phenyleneterephthalamide from p-phenylenediamine requires, on the one hand, thoroughly purified p-phenylenediamine, the purification being performed either during its production or directly before polymer synthesis, and, on the other hand, the conduction of polymer synthesis under conditions eliminating oxidation of diamine, especially at the stage of preparing or using its solutions.

Known methods of producing poly-p-phenyleneterephthalamide differ from one another by the type of an organic solvent employed. The following solvents have been proposed to be used: hexamethylphosphoramide, mixtures of hexamethylphosphoramide with other amide solvents, solutions of alkaline or alkaline-earth metals (LiCl, LiHO$_3$, LiSCN, KSCN, CaCl$_2$, MgCl$_2$, etc.) in various linear or cyclic N-alkyl-substituted amides of acide (dimethylacetamide, tetramethylurea, N-methylpyrrolidone, etc.), the so-called amide-salt solvents.

When hexamethylphosphoramide was used as the solvent, poly-p-phenyleneterephthalamide was obtained having specific viscosity $\eta_{sp}=1.59$ (logarithmic viscosity $\eta_{inh}=1.90$ dl/g) which was not suitable for manufacturing high-strength fibres, and only after the method was improved (intensive stirring of the mass), polymer was obtained with $\eta_{inh}=5.3$ dl/g meeting the requirements imposed on it in manufacturing high-strength fibres.

High-molecular poly-p-phenyleneterephthalamide and its copolymers are successfully obtained in mixtures of hexamethylphosphoramide with other amide solvents. For instance, poly-p-phenyleneterephthalamide with $\eta_{inh}=3.80$ dl/g was obtained in a mixture hexamethylphosphoramide+N-methylpyrrolidone (2:1 by volume).

Less successful is the synthesis of high-molecular poly-p-phenylene-terephthalamide and its copolymers in a solution of amide-salt solvents which are the largest and the most readily available group of solvents widely used for synthesizing aromatic polyamides of different structure.

Thus, the known methods of producing poly-p-phenyleneterephthalamide and its copolymers yield a high-molecular product only if hexamethylphosphoramide or its mixtures with other amide solvents are used as solvents. However, essential disadvantages are inherent in these solvents:

(1) the mandatory presence of hexamethylphosphoramide which in a number of cases narrows the range of raw material resources for producing the end products;

(2) hexamethylphosphoramide is one of the most high-boiling amide solvents (boiling point 230°–232° C.) which complicates and makes more expensive the processes of its preparation for synthesis (distillation for drying) and subsequent regeneration after isolating the end products as compared to amide solvents having lower boiling points.

It is an object of the invention to provide a method which will yield, in a solution of readily available amide-salt solvents, poly-p-phenyleneterephthalamide or its copolymers with a high molecular weight, suitable for manufacturing high-strength fibres, and simplify the technology of the whole process.

In accordance with this and other objects the invention resides in that p-phenylenediamine or p-phenylenediamine (50–95 mol.%) and an aromatic diamine of the diphenyl series (50–5 mol.%) is dissolved in amide-salt solvents consisting of linear or cyclic N-alkyl-substituted amides of acids and of salts of alkaline and alkaline-earth metals soluble in said amides in amounts of 1–3 moles per mole of diamines being dissolved; into the solutions thus obtained, terephthalic acid dichloride or a mixture of terephthalic acid dichloride (50–95 mol.% and an aromatic acid dichloride of the diphenyl series (50–5 ml.%) in amounts equimolar to the diamines is introduced at 0°–20° C.; tertiary amines in amounts 2–6 moles per mole of the initial diamines are added to this reaction mixture, the latter being kept for 3–70 minutes with stirring. The end product is then separated from the mass obtained.

Introduction of a tertiary amine into the amide-salt solvent increases the rate of polycondensation of said aromatic diamines with said aromatic acid dichlorides. Owing to this, in solvents whose dissolving power towards polymeric products being synthesized is not high enough, as in the case of amide-salt solvents towards poly-p-phenyleneterephthalamide and its copolymers (for example, dimethylacetamide+LiCl), polymeric products are obtained of a higher molecular weight than without introducing a tertiary amine. Since the rate of polycondensation increases due to introduction of tertiary amines, the requirements imposed upon the purity of the initial solvent are not so rigid, particularly insofar as its moisture content is concerned. In order to obtain high-molecular products by the proposed method, it is possible to use a solvent with a moisture content of up to 0.07%.

As tertiary amines are chemically active towards the above-cited aromatic acid dichlorides, the order of introducing the components into the reaction system is an important aspect when producing high-molecular poly-p-phenyleneterephthalamide and its copolymers. High-molecular polymer products are obtained when a tertiary amine is introduced into the system just after acid dichlorides are charged. Introduction of a tertiary amine prior to charging acid dichlorides does not change considerably the molecular weight of synthesized polymeric products.

To obtain colourless high-molecular poly-p-phenyleneterephthalamide and its copolymers, it is recommendable for producing a solution of p-phenylenediamine or a solution of p-phenylenediamine and an aromatic diamine of the diphenyl series to use p-phenylenediamine dihydrochloride, the latter being dissolved in the presence of tertiary amines in amounts of 2–4 moles per mole of p-phenylenediamine dihydrochloride.

The tertiary amine, introduced at the stage of dissolving p-phenylenediamine dihydrochloride, interacts with hydrogen chloride entering into p-phenylenediamine dihydrochloride. Due to this, the latter dissolves rapidly with the formation of free diamine. At 20°–30° C. the duration of p-phenylenediamine dihydrochloride dissolution does not exceed 10–15 minutes. Since p-phenylenediamine dihydrochloride is more stable towards oxidation than p-phenylenediamine. The latter, being liberated during interaction of said salt with tertiary amine, is pure enough and is not subject to noticeable oxidation because of rapid dissolving at a moderate temperature. After subsequent introduction into the obtained solutions, containing initial aromatic diamines, of terephthalic acid dichloride or terephthalic acid dichloride and an aromatic dichloride of the diphenyl series as well as of 2–6 moles of a tertiary amine per mole of the initial diamines, high-molecular polymeric products are rapidly formed which are similar to those obtained from carefully purified p-phenylenediamine under the conditions precluding its oxidation (for example, under continuous purging of the reactor with an inert gas).

α-Picoline, β-picoline, dimethylbenzylamine, dimethylaniline, quinoline, pyridine, triethylamine, or N-methylmorpholine are recommendable for use as tertiary amines.

To simplify the technology of isolating the end product from the mass obtained, the latter is recommended to be granulated, washed with water, and dried.

Table 1 gives the results obtained for synthesis of poly-p-phenyleneterephthalamide in amide-salt solvents by the proposed and known methods.

Low viscosity of polymer obtained from p-phenylenediamine dihydrochloride without tertiary amines is due to low solubility of p-phenylenediamine chloride in the amide-salt solvents used; therefore, the polycondensation reaction proceeds under heterogeneous conditions at a low rate.

The given results indicate that poly-p-phenyleneterephthalamide obtained by the proposed method has a considerably higher molecular weight than that produced by the known method.

Table 1

| Initial diamine | Tertiary amine | Specific viscosity, $\eta$ | Logarithmic viscosity, $\eta_{inh}$ dl/g |
|---|---|---|---|
| p-Phenylenediamine | present /by the proposed method/ | up to 11.0 | up to 4.95 |
| p-Phenylenediamine dihydrochloride | present /by the proposed method/ | up to 15.1 | up to 5.55 |
| p-Phenylenediamine | absent /by known method/ | up to 2.31 | up to 2.39 |
| p-Phenylenediamine dihydrochloride | absent /by known method/ | up to 0.41 | up to 0.69 |

As initial reagents for producing poly-p-phenyleneterephthalamide or its copolymers use is made of terephthalic acid dichloride with melting point 81°–83° C. containing no less than 62% of acid chloride groups. p-Phenylenediamine or p-phenylenediamine dihydrochloride with the content of main component no less than 99% is used. In order to obtain co-polymers, part (5–50 mol.%) of terephthalic acid dichloride and/or p-phenylenediamine is replaced, respectively, by aromatic acid dichlorides of the diphenyl series (for example, diphenyl-4,4'-dicarboxylic acid dichloride, benzophenone-4,4'-dicarboxylic acid dichloride, or diphenyloxide-4,4'-dicarboxylic acid dichloride) and aromatic diamines of the diphenyl series (for example, benzidine, 4,4'-, -diaminodiphenyloxide, 4,4'-diaminodiphenylsulphone, 4,4'-diaminobenzophenone, o-toluidine or o-dianisidine).

According to the invention, tertiary amines of different structure can be used as tertiary amines, namely: aliphatic tertiary amines (for example, triethylamine), aromatic tertiary amines (for example, dimethyl- or diethylaniline), fatty aromatic tertiary amines (for example, dimethyl-benzylamine), heterocyclic tertiary amines (for example, pyridine, substituted pyridines: picoline, lutidine, quinoline, or N-methylmorpholine).

As amide-salt solvents for producing high-molecular poly-p-phenyleneterephthalamide and its copolymers use can be made, according to the invention, of solutions of LiCl, LiNO$_3$, LiBr, LiSCN, NaNO$_3$, NaSCN, KSCN, CaCl$_2$, MgCl$_2$ and other similar salts of alkaline or alkaline-earth metals in linear or cyclic N-alkyl-substituted amides, for example, dimethylacetamide, N-methylpyrrolidone, diethylacetamide, or tetramethylurea. Salt concentration in the solvent should be 1–3 moles per mole or aromatic diamines (or aromatic acid dichlorides).

It is preferable to accomplish the proposed method in the following way.

p-Phenylenediamine and a salt of alkaline or alkaline-earth metal or p-phenylenediamine dihydrochloride, said salt and tertiary amine are dissolved upon stirring in an amide at 20°–60° C. for 10–60 minutes. Diamine concentration in the solution is 0.1–0.4 mole/l; the content of salt of alkaline or alkaline-earth metal is 1–3 moles per mole of diamine; the content of tertiary amine is 2–4 moles per mole of diamine dihydrochloride. For producing copolymers, part (5–50 mole %) of p-phenylenediamine or its dihydrochloride is replaced with an aromatic diamine of the diphenyl series.

The obtained solution is cooled down to 0°–20° C. and terephthalic acid dichloride or its mixture with an aromatic acid chloride of the diphenyl series is added with stirring in amounts equimolar to that of diamine. Then 2-6 moles of tertiary amine (as calculated for diamines) are introduced into the reaction mixture, the stirring being continued for 3-70 minutes at a temperature growing within the range of 0°-60° C. (the increase of temperature is due to heat liberation during polycondensation and to the stirring of the mixture). This is accompanied by a fast increase of the reaction mixture viscosity until the mixture becomes a non-fluid mass. The content of the end product in the mass is 5-10 wt.%. It can be separated from the mass in the form of powder or porous granules for further application.

In order to obtain the end product in the form of a powder, said mixture is ground directly in the reactor for polymer synthesis, washed with water after discharging to remove the components of the solvent, and dried at 70°-90° C. The bulk weight of the obtained powder is 0.3-0.4 g/cm$^3$.

In order to obtain the end product in the form of granules, said mass is granulated (for example, in a screw granulator). After washing with water and drying at 70°-90° C., the granules are obtained 2-3 mm in diameter, 3-6 mm long, and the bulk density 0.5-0.6 g/cm$^3$.

When the end product is obtained in the form of granules, the operation of washing is simplified and reduced in time. The granulated product is very convenient for producing spinning solutions in fibre manufacture.

On the basis of poly-p-phenyleneterephthalamide obtained by the proposed method, fibre was produced by wet spinning from a solution in concentrated sulphuric acid with tensile strength 185 gs/tex, relative elongation 4%, initial modulus 12,000 kgs/mm$^2$ and density 1.45 g/cm$^3$ which corresponds to the properties of known high-strength fibres.

For a better understanding of the proposed invention specific examples are given hereinbelow by way of illustration. The values of logarithmic viscosity ($\eta_{inh}$) given in the examples are calculated from specific viscosity ($\eta_{sp}$) determined for polymer solutions in concentrated sulphuric acid at a concentration (c) of the polymer in the solution 0.5 g/dl at 25° C. by the following formula:

$$\eta_{inh} = \frac{2.3 \lg(\eta_{sp} + 1)}{C}$$

EXAMPLE 1

162 g (1.5 moles) of p-phenylenediamine, 150 g (3.55 moles) of LiCl, and 6 l of dimethylacetamide with a moisture content of 0.07% are put into a 10 liter reactor made of stainless steel and fitted with a stirrer (about 100 r.p.m.) and a jacket for a heat transfer agent. At 50°-60° C. p-phenylenediamine is dissolved upon stirring for 15 minutes. The solution obtained is cooled down to 10°-12° C. and 304.5 g (1.5 moles) of terephthalic acid dihydrochloride are added into said solution upon stirring. After the acid dichloride is charged, 294 ml (about 3.0 moles) of α-picoline are introduced into the reaction mixture, the stirring being continued for 55-60 minutes. The mass obtained is granulated, washed with water, and dried at 70°-90° C. The finished product is in the form of granules with $\eta_{inh}$=4.95 dl/g.

EXAMPLE 2

271.5 g (1.5 moles) of p-phenylenediamine dihydrochloride and 79 g (1.87 moles) of LiCl in 6 l of dimethylacetamide containing 440 ml (4.5 moles) of α-picoline are dissolved in a 10 liter reactor at 23°-25° C. for 10 minutes. The obtained solution is cooled down for 4 minutes to 14°-16° C., and 304.5 g (1.5 moles) of terephthalic acid dichloride is added to the solution upon stirring. After charging the acid dichloride, 294 ml (about 3.0 mole) of α-picoline are introduced into the reaction mixture. The reaction mixture is stirred for 55-60 minutes. The mass obtained is granulated, washed with water, and dried at 70°-90° C. The finished product is in the form of yellowish granules with $\eta_{inh}$=5.55 dl/g.

EXAMPLE 3

Synthesis of poly-p-phenyleneterephthalamide is accomplished by following the procedure described in Example 2, the only difference being the duration of stirring equal to 70 minutes after introduction of 294 ml (about 3.0 moles) of α-picoline into the reaction mixture.

The mass is obtained in the form of powder. After discharging from the reactor, the powder is washed with water to remove the solvent components and dried at 70°-90° C. The bulk weight of the obtained powder is 0.3-0.4 g/cm$^3$ and $\eta_{inh}$=5.98 dl/g.

EXAMPLE 4

1.267 g (7.0 moles) of p-phenylenediamine dihydrochloride, 28.0 l of dimethylacetamide, 370 g (about 8.73 moles) of LiCl, and 2.050 ml (21 moles) of α-picoline are put into a 35 liter reactor made of stainless steel and fitted with a stirrer (110 r.p.m.) and a jacket. p-Phenylenediamide dihydrochloride is dissolved at 20°-25° C. upon stirring for 15 minutes and the solution obtained is cooled down to 15° C. 1.421 g (7.0 moles) of terephthalic acid dichloride is charged into the cooled stirred solution for about 2 minutes, after which 1.370 ml (14 moles) of α-picoline are introduced. The reaction mixture is stirred for 3 minutes. The mass obtained is granulated, washed, and dried by following the procedure described in Example 1, the finished product being obtained with $\eta_{inh}$=5.18 dl/g.

EXAMPLE 5

0.540 g (0.005 mole) of p-phenylenediamine are dissolved in a glass flask with a stirrer in 20 ml of dimethylacetamide containing 0.5 g of LiCl upon heating on a water bath at 50°-60° C. for 10 minutes. The solution obtained is cooled down to 0° C. and 1.015 g (0.005 mole) of terephthalic acid dichloride are rapidly added to the solution upon stirring. After acid dichloride has been charged, 0.98 ml (0.01 mole) of β-picoline are introduced into the reaction mixture and the stirring is continued for 55-60 minutes. The mass obtained is discharged from the flask and mixed with water, the polymer being precipitated. The polymer isolated has $\eta_{inh}$=3.34 dl/g.

The production of poly-p-phenyleneterephthalamide from p-phenylenediamine in Examples 6-11 is carried out by following the procedure described in Example 5, but instead of β-picoline other tertiary amines are used. The types of tertiary amines and the values of logarithmic viscosity of the polymer obtained are given in Table 2.

EXAMPLE 12

633.5 g (3.5 moles) of p-phenylenediamine dihydrochloride, 28 l of dimethylacetamide, 356 g (8.4 moles) of LiCl, and 980 ml (10 moles) of α-picoline ae put into a 35 liter reactor. p-Phenylenediamine dihydrochloride is dissolved upon stirring for 15 minutes at 20°–25° C., the solution obtained being cooled down to 15° C. A mixture of 355 g (1.75 moles) of terephthalic acid dichloride and 488 g (1.75 moles) of diphenyl-4,4'-dicarboxylic acid dichloride is added to the cooled stirred solution for 3 minutes. 980 ml (10 moles) of α-picoline are introduced into the reaction mixture, after which it is stirred for 30 minutes. The separation of the end product from the obtained mass is performed by following the procedure described in Example 1. The finished copolymer has $\eta_{inh}$=5.92 dl/g.

Table 2

| Nos. of examples | Tertiary amine | Amount of tertiary amine ml | Amount of tertiary amine mole | Amount of tertiary amine in moles per mole of p-phenylenediamine | $\eta_{inh}$ dl/g |
|---|---|---|---|---|---|
| 6 | Dimethylbenzylamine | 2 | 0.013 | 2.6 | 3.46 |
| 7 | Dimethylaniline | 1.3 | 0.01 | 2.0 | 3.40 |
| 8 | Quinoline | 1.2 | 0.01 | 2.0 | 3.28 |
| 9 | Pyridine | 0.81 | 0.01 | 2.0 | 3.69 |
| 10 | α-Picoline | 2.94 | 0.03 | 6.0 | 4.60 |
| 11 | Triethylamine | 1.4 | 0.01 | 2.0 | 2.75 |

EXAMPLE 13

0.513 g (0.00475 moles) of p-phenylenediamine and 0.046 g (0.00025 moles) of benzidine are dissolved in a glass flask with a stirrer in 20 ml of dimethylacetamide containing 0.5 g of LiCl upon heating on a water bath at 50°–60° C. for 10 minutes. The obtained solution is cooled down to 8°–10° C. and 1.015 g (0.005 moles) of terephthalic acid dichloride are rapidly added to said solution. After charging the acid dichloride, 0.98 ml (0.01 moles) of α-picoline are added into the reaction mixture and the stirring is continued for 55–60 minutes. The copolymer separated by following the procedure described in Example 5 has $\eta_{inh}$=3.40 dl/g.

In Examples 14–23 copolymers are obtained by following the procedure described in Example 13, using aromatic diamines, aromatic acid dichlorides, LiCl, and α-picoline given in Table 3. The Table presents also logarithmic viscosity ($\eta_{inh}$) of the copolymers obtained.

EXAMPLE 24

0.2704 g (0.0025 mole) of p-phenylenediamine are dissolved in a glass flask fitted with a stirrer in 20 ml of dimethylacetamide containing 0.67 g $CaCl_2$ at 18°–20° C. for 15 minutes. 0.5075 g (0.0025 mole) of terephthalic acid dichloride and 0.98 ml (0.01 mole) of α-picoline are added into the solution obtained and the stirring is continued for 60 minutes. The polymer separated by following the procedure described in Example 5 has $\eta_{inh}$=3.26 dl/g.

Poly-p-phenyleneterephthalamide in Examples 25–29 is produced by following the procedure described in Example 24, using different amide-salt solvents.

Table 3

| Nos of examples 1 | p-Phenylenediamine g 2 | p-Phenylenediamine mole 3 | p-Phenylenediamine mol.% 4 | Aromatic diamines of the diphenyl series Name and formula 5 | g 6 | mole 7 | mol.% 8 | Terephthalic acid dichloride g 9 | Terephthalic acid dichloride mole 10 | Terephthalic acid dichloride mol.% 11 | Aromatic acid dichloride of the diphenyl series name and formula 12 | g 13 | mole 14 | mol.% 15 | Moles of LiCl per mole of aromatic diamines 16 | Moles of picoline per mole of aromatic diamines 17 | $\eta_{inh}$ dl/g 18 |
|---|---|---|---|---|---|---|---|---|---|---|---|---|---|---|---|---|---|
| 14 | 0.243 | 0.00225 | 90 | Benzidine ($H_2N$–⌬–⌬–$NH_2$) | 0.046 | 0.00025 | 10 | 0.5075 | 0.0025 | — | — | — | — | — | 3 | 2 | 4.3 |
| 15 | 0.54 | 0.005 | 100 | — | — | — | — | 0.9135 | 0.0045 | 90 | Diphenyloxide-4,4'-dicarboxylic acid dichloride | 0.1476 | 0.0005 | 10 | 1.2 | 2 | 3.76 |
| 16 | 0.27 | 0.0025 | 100 | — | — | — | — | 0.4059 | 0.002 | 80 | Diphenyl-4,4'-di carboxylic acid dichloride | 0.1396 | 0.0005 | 20 | 2.4 | 4 | 4.08 |
| 17 | 0.513 | 0.00475 | 95 | 4,4'-Diaminodiphenyloxide | 0.05 | 0.00025 | 5 | 1.015 | 0.005 | 100 | — | — | — | — | 2.4 | 2 | 3.55 |
| 18 | 0.513 | 0.00475 | 95 | 4,4'-Diaminophenylsulphone | 0.062 | 0.00025 | 5 | 1.015 | 0.005 | 100 | — | — | — | — | 2.4 | 2 | 3.50 |
| 19 | 0.54 | 0.005 | 100 | — | — | — | — | 0.9135 | 0.0045 | 90 | Benzophenone-4,4'-dicarboxylic acid dichloride | 0.1535 | 0.0005 | 10 | 2.4 | 2 | 3.89 |
| 20 | 0.513 | 0.00475 | 95 | 4,4'-Diaminobenzophenone | 0.053 | 0.00025 | 5 | 1.015 | 0.005 | 100 | — | — | — | — | 1.2 | 3 | 4.21 |
| 21 | 0.513 | 0.00475 | 95 | Ortho-tolidine | 0.053 | 0.00025 | 5 | 1.015 | 0.005 | 100 | — | — | — | — | 1.2 | 3 | 4.12 |
| 22 | 0.513 | 0.00475 | 95 | Ortho-dianisidine | 0.061 | 0.00025 | 5 | 1.015 | 0.005 | 100 | — | — | — | — | 1.2 | 3 | 3.62 |

Table 3-continued

| Nos of examples 1 | p-Phenylenediamine | | Aromatic diamines and their content Aromatic diamines of the diphenyl series | | | Terephthalic acid dichloride | | | Aromatic acid dichlorides and their content Aromatic acid dichloride of the diphenyl series | | | | Moles of LiCl per mole of aromatic diamines 16 | Moles of picoline per mole of aromatic diamines 17 | $\eta_{inh}$ dl/g 18 |
|---|---|---|---|---|---|---|---|---|---|---|---|---|---|---|---|
| | g 2 | mole 3 | Name and formula 5 | g 6 | mole 7 | mol.% 8 | g 9 | mole 10 | mol.% 11 | name and formula 12 | g 13 | mole 14 | mol.% 15 | | | |
| 23 | 0.27 | 0.0025 | 4,4'-Diaminodiphenyloxide  | 0.5 | 0.0025 | 50 | 1.015 | 0.005 | 100 | — | — | — | — | 1.2 | 2 | 3.02 |

Table 4 presents the types of the amide-salt solvents used and logarithmic viscosity ($\eta_{inh}$) of the obtained polymer.

Table 4

| Nos. of examples | Amide-salt solvent | | | $\eta_{inh}$, dl/g |
|---|---|---|---|---|
| | linear or cyclic N-alkyl-substituted amide of an acid | salt of alkaline or alkaline-earth metal | | |
| | | type of the salt | amount, g | |
| 25 | Diethylacetamide | LiCl | 0.3 | 2.08 |
| 26 | N-Methylpyrrolidone | LiCl | 0.3 | 3.51 |
| 27 | Dimethylacetamide | MgCl$_2$ | 0.2 | 2.24 |
| 28 | Dimethylacetamide | 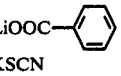 | 0.64 | 3.83 |
| 29 | Dimethylacetamide | KSCN | 2.0 | 1.24 |

EXAMPLE 30

13.5796 g (0.075 mole) of p-phenylenediamine dihydrochloride 300 ml of dimethylacetamide, 5.7 g of LiCl, and 14.8 ml (0.15 moles) of α-picoline are put into a 0.5 liter reactor made of stainless steel and fitted with a stirrer and a jacket for heat-transfer agent supply. p-Phenylenediamine dihydrochloride is dissolved upon stirring for 10 minutes at 20°-22° C. and the solution obtained is cooled down to 15° C. 15.225 g (0.075 mole) of terephthalic acid dichloride are added to the cooled stirred solution, after which 22.0 ml (0.225 mole) of α-picoline are charged. The reaction mixture is stirred for 30 minutes. The mass obtained is granulated, washed, and dried by following the procedure described in Example 1, the end product with $\eta_{inh}=4.96$ dl/g being obtained.

EXAMPLE 31

13.5796 g (0.075 mole) of p-phenylenediamine dihydrochloride and 5.7 g of LiCl in 300 ml of dimethylacetamide containing 29.5 ml (0.3 mole) of α-picoline are dissolved in a 0.5-- liter reactor at 20°-22° C. for 10 minutes. The solution obtained is cooled down to 15° C. and 15.225 g (0.075 mole) of terephthalic acid dichloride are introduced into the solution upon stirring, after which 14.8 ml (0.15 mole) of α-picoline are charged. The reaction mixture is stirred for 30 minutes. The mass obtained is granulated, washed, and dried by following the procedure described in Example 1. The finished product is separated and has $\eta_{inh}=4.5$ dl/g.

EXAMPLE 32

0.905 g (0.005 mole) of p-phenylenediamine dihydrochloride are dissolved at 20°-22° C. in a glass flask fitted with a stirrer in 20 ml of diacetylamide containing 0.3 g of LiCl and 1.2 ml (0.01 mole) of N-methylmorpholine for 10 minutes. The obtained solution is cooled down to 8°-10° C. and 1.015 g (0.005 mole) of terephthalic acid dichloride are added upon stirring. After the acid dichloride is charged, 1.2 ml (0.01 mole) of N-methylmorpholine are introduced into the reaction mixture and the stirring is continued for 60 minutes. The polymer separated by following the procedure described in Example 5 has $\eta_{inh}=3.20$ dl/g.

EXAMPLE 33

0.905 g (0.005 mole) of p-phenylenediamine dihydrochloride are dissolved at 20°-22° C. in a glass flask fitted with a stirrer in 20 ml of dimethylacetamide containing 0.3 g of LiCl and 1.5 ml (0.01 mole) of dimethylbenzylamine for 10 minutes. The solution obtained is cooled down to 8°-10° C. and 1.015 g (0.005 mole) of terephthalic acid dichloride are added upon stirring. After the acid dichloride is charged, 1.5 ml (0.01 mole) of dimethylbenzylamine are added and stirring is continued for 60 minutes. The polymer separated by following the procedure described in Example 5 has $\eta_{inh}=2.70$ dl/g.

What is claimed is:

1. A process for producing a fiber forming poly-para-phenyleneterephthalamide or a copoly-para-phenyleneterephthalamide comprising the steps of:
   (1) dissolving para-phenylenediamine or a mixture of 50 to 95 mol. percent of p-phenylenediamine with 50 to 5 mol. percent of an aromatic diamine of the diphenyl series selected from the group consisting of benzidine, 4,4'-diaminodiphenyl oxide, 4,4'-diaminodiphenyl sulfone, 4,4'-diaminobenzophenone, ortho-tolidine, ortho-dianisidine, in an amide-salt solvent in which the metal salt is used in an amount of between 1 and 3 mole per mole of the dissolved aromatic diamines and is selected from the group consisting of organic or inorganic alkali or alkaline earth metal salts soluble in the amide solvent and in which the amide solvent is selected from the group consisting of linear N-dialkyl-substituted carbamic acids, lower aliphatic acids and inner cyclic N-alkyl-substituted amides of aliphatic aminoacids, to obtain a solution thereof; (2) adding to said solution with stirring at a temperature in the range of from about 0° to +20° C. terephthalic acid dichloride or a mixture of 50 to 95 molar percent of terephthalic acid dichloride with 50 to 5 molar percent of a dichloride of an aromatic diacid of the diphenyl series selected from the group consisting of diphenyl-4,4'-dicarboxylic acid dichloride, diphenyloxide-4,4'-dicarboxylic acid dichloride, benzophenone-4,4'-dicarboxylic acid dichloride in which said aromatic diacid dichloride is employed in equimolar amounts with said aromatic diamine, to obtain a homogeneous reaction mixture; (3) adding to said reaction mixture, with stirring, a tertiary amine selected from the group consisting of α-picoline, β-picoline, N,N-dimethylbenzylamine, N,N-dimethylaniline, quinoline, pyridine, triethylamine, N-methylmorpholine, in an amount of from 2 to 6 moles per mole of the starting aromatic diamines; (4) stirring the resulting reaction mixture for a period of from 3 to 70 minutes to obtain poly-para-phenyleneterephthalamide, and (5) separating the resulting poly-para-phenyleneterephthalamide from the reaction mixture.

2. A process as claimed in claim 1, wherein in preparing aromatic diamine solutions, the para-phenylene-diamine is used in the form of para-phenylene-diamine dihydrochloride and wherein 2 to 4 moles of tertiary amine per mole of para-phenylenediamine dihydrochloride is dissolved in the amide-salt solvent.

3. A process as claimed in claim 1, wherein said amide-salt solvent is selected from the group consisting of dimethylacetamide and lithium chloride, dimethylacetamide and calcium chloride, diethylacetamide and lithium chloride, N-methylpyrrolidone and lithium chloride, dimethylacetamide and magnesium chloride, dimethylacetamide and lithium benzoate, dimethylacetamide and potassium rhodanide.

4. A process as claimed in claim 1, wherein, in order to prepare the desired poly-para-phenyleneterephthalamide in the form of granules, the product of the process of claim 1 is granulated, the granules are washed and dried.